US006298375B1

(12) United States Patent
Millard

(10) Patent No.: US 6,298,375 B1
(45) Date of Patent: Oct. 2, 2001

(54) METHOD OF MIGRATING A MAIL POST OFFICE

(75) Inventor: Lee Millard, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/114,632

(22) Filed: Jul. 13, 1998

(30) Foreign Application Priority Data

May 28, 1998 (GB) .................................................. 9811349

(51) Int. Cl.[7] ...................................................... G06F 15/16
(52) U.S. Cl. ............................................ 709/206; 709/207
(58) Field of Search .................................... 709/206, 207, 709/224; 707/102, 201

(56) References Cited

U.S. PATENT DOCUMENTS

| 5,146,403 | * | 9/1992 | Goodman | 707/102 |
| 5,758,354 | * | 5/1998 | Huang et al. | 707/201 |
| 5,841,982 | * | 11/1998 | Brouwer et al. | 709/224 |
| 6,101,320 | * | 8/2000 | Schuetze et al. | 709/206 |

* cited by examiner

Primary Examiner—Dung C. Dinh
Assistant Examiner—Kimberly Flynn
(74) Attorney, Agent, or Firm—Edward H. Duffield

(57) ABSTRACT

A method of migrating a mail post office from a first mail server H to a second mail server H2 in a mail network is disclosed. The first mail server H acts as a first mail directory synchronization server (DS Server) and the post office initially acts as a mail directory synchronization requestor (DS Requestor) to the first DS Server. The method comprises the steps of:

establishing the second mail server as a second DS Server; establishing a third mail server H3 to act as a DS Requestor to said first DS Server; redirecting mail on said post office to said second mail server; removing the DS requester for said post office from said first server; deleting all user entries for said post office from a mail directory on said first server; and adding said post office as a DS Requester to said second server.

7 Claims, 2 Drawing Sheets

METHOD OF MIGRATING A MAIL POST OFFICE

FIELD OF THE INVENTION

The present invention relates to a method of migrating a mail post office.

BACKGROUND OF THE INVENTION

In an organization spread across many physical sites, it is common for users at each site to connect to a local electronic mail server, which can be regarded as a Post Office, to collect and receive electronic mail. Directory Synchronization is the process whereby multiple Post Offices or mail servers are able to automatically share their directories (lists of users and their mail ids).

FIG. 1 shows an electronic mail network having a plurality of post offices 10 each having a plurality of local users and a hub mail server H. The mail server H also acts as a directory synchronization server (DS Server), and in the case of an MS Mail network, there can be only one synchronization server on the network. Each post office maintains a directory of its local users and any changes in this directory, such as additions, deletions or amendments are sent to the DS Server at the hub. The DS Server in turn forwards these changes to each post office 10 so that any user connected to any post office can select any other user as a mail recipient. Mail from a user at one post office to a user at another post office is routed via the mail server to the destination post office where it is stored until the mail recipient checks its incoming mail with the destination post office.

In particular, in an MS Mail network, because only one DS Server is allowed, all MS Mail post offices must be designated as requesters for this DS Server. This makes the task of migrating to a new server extremely difficult as it means an all or nothing approach to migrating post offices to a new DS Server or manually synchronizing directories.

DISCLOSURE OF THE INVENTION

According to the present invention there is provided a method of migrating a mail post office from a first mail server to a second mail server in a mail network, said first mail server acting as a first mail directory synchronization server (DS Server) and said post office initially acting as a mail directory synchronization requestor (DS Requestor) to said first DS Server, said method comprising the steps of: establishing said second mail server as a second DS Server; establishing a third mail server acting as a DS Requestor to said first DS Server; redirecting mail on said post office to said second mail server; removing the DS requester for said post office from said first server; deleting all user entries for said post office from a mail directory on said first server; and adding said post office as a DS Requester to said second server.

In a second aspect the invention provides a mail network comprising a first, second and third mail server, said first mail server acting as a first directory synchronization server (DS Server), said second mail server acting as a second DS Server, and said third mail server acting as a directory synchronization requestor (DS Requestor) to said first DS Server, said network comprising a first post office acting as a (DS Requestor) to said first DS Server and a second post office acting as a (DS Requestor) to said second DS Server, each of said DS Requestors and DS Servers including respective mail directories, wherein said second and third servers are interconnected so that mail directory updates on said first post office are replicated from said third server to said second server and mail directory updates on said second post office are replicated from said second server to said third server.

The invention enables a staged migration, which may be over months, rather than risk a high profile and technically difficult big bang migration.

The preferred embodiment allows migration of a large number of MSMail Post Offices using an MSMail Directory Synchronization server to a new MS Exchange Directory Synchronization Server with minimal existing service interruption. This overcomes the above described limitation of the MS Mail software and enables the users of the service to seamlessly migrate from one network to the other network, while maintaining directory integrity, with automatic directory updates and mail flow throughout.

DESCRIPTION OF THE PREFERRED EMBODIMENTS

Figure 1:
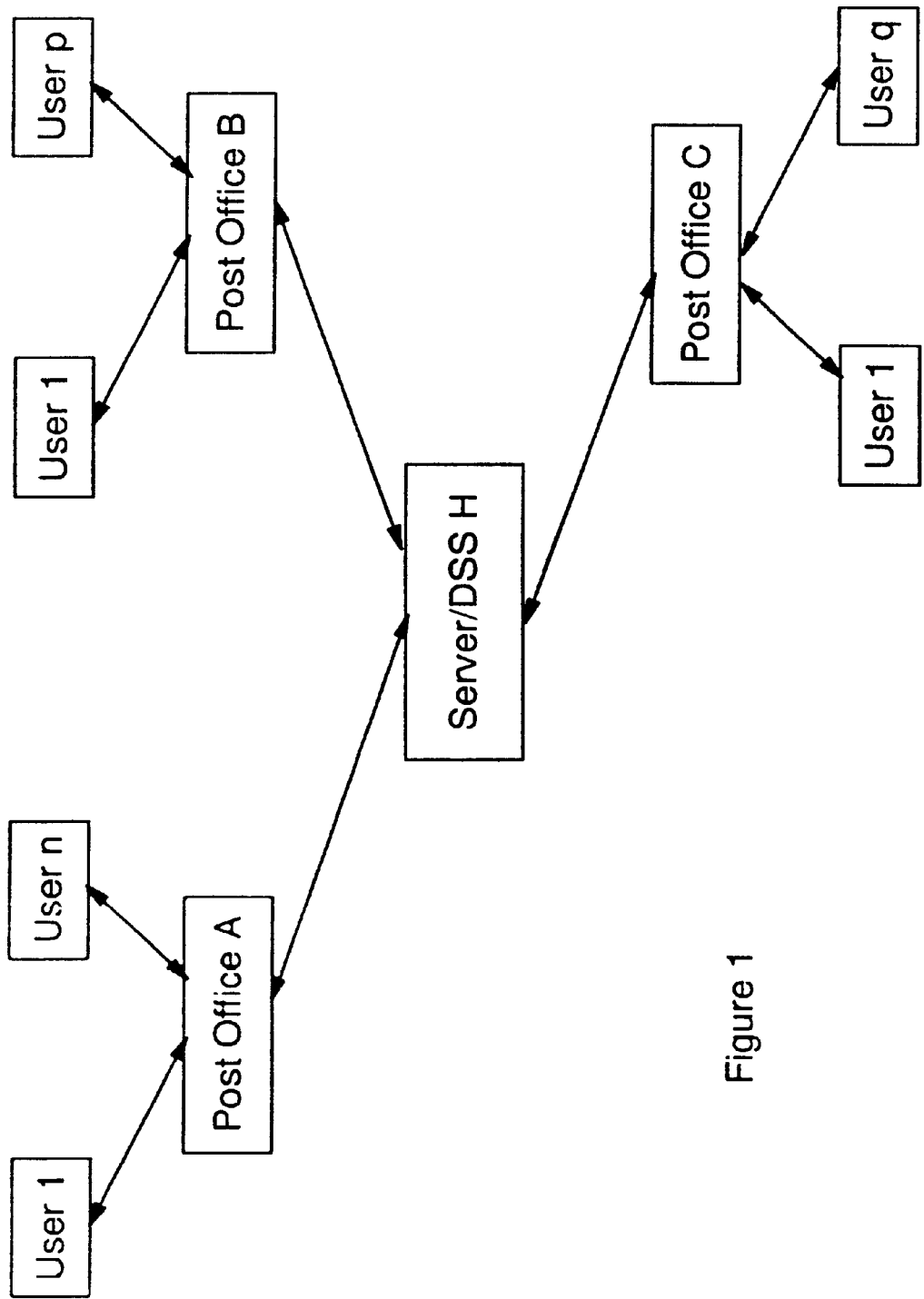
FIG. 1 is a schematic view of a conventional MS Mail Network.

Referring now to FIG. 1, an MSMail network comprises many Post Offices 10. These are all configured in a Star configuration with a central hub post office H. This central hub allows mail to flow from one Post Office, A to all others B,C. So mail from a user at A to a user at B travels from A to H and from H to B.

The Hub Post Office also acts as the Directory Synchronization Server (DS Server) to all of the other Post Offices which are Directory Synchronization Requestors (DS Requestors). So changes such as new users, deleted users, changes to users on one of the DS requestors are sent to the DS server. Once all updates have been received by the DS server from all of the DS Requestors in the network, then the DS Server distributes these back down to all of the DS Requestors in the network. These updates are then processed by the individual DS Requestors in the network ready for use by the users of that post office.

Figure 2:
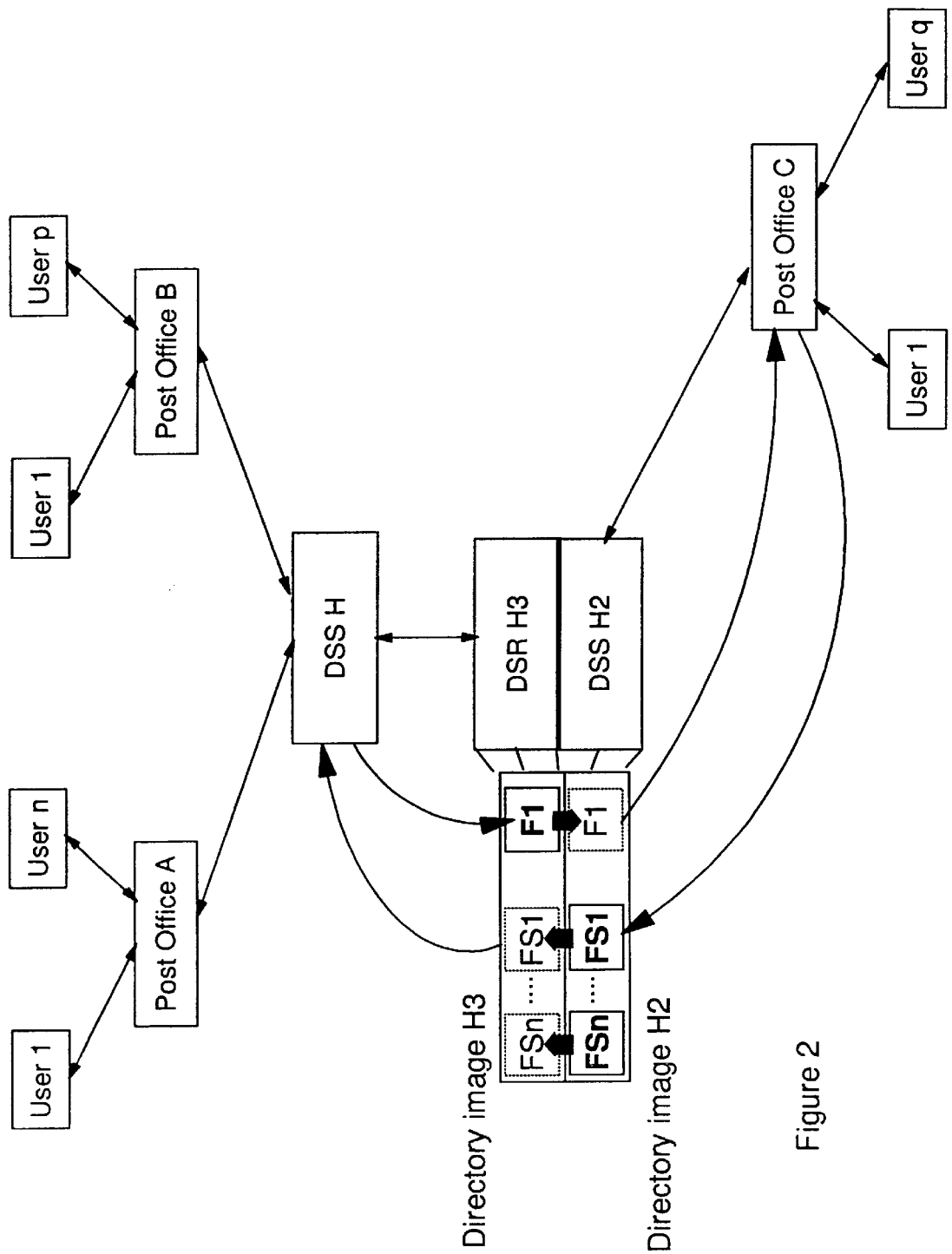
FIG. 2 is a schematic view of a network for implementing the present invention.

The invention allows the replacement the MS Mail Hub H with a new MS Exchange hub server H2 running on Windows NT, FIG. 2. The process of getting to the desired configuration is not one which can be done in a big bang because of logistics, timing and effort required. The invention allows:

the users of a Post Office which has migrated to the MS Exchange DS Server H2 to send and receive mail not only with users whose Post Office has also migrated to the new MS Exchange DS Server H2 but also with those users whose Post Office is still connected to the old MSMail DS Server H; and directory updates on the migrated Post Office to be not only shared with other Post Offices which had already migrated but also with the Post Offices which are still connected to the old MS Mail DS Server H.

This has never been technically possible with MSMail Networks, as a single Directory server had to service all Post Offices within a Network.

Essentially during the migration two MSMail networks operate, one centered on the MSMail DS Server H and the other centered on the MS Exchange DS Server H2.

These two DS Servers need to share directory information. A copy of the Directory on the MS Mail DS Server H could be obtained by setting up an MS Exchange server as a DS Requestor of the MSMail DS Server. However, there is a limitation within MS Exchange which means that an MS Exchange server can not act as a DS Requestor on a MS Mail DS Server at the same time as it acts as a DS Server to another MS Mail network.

The invention overcomes this limitation by having another MS Exchange server H3 within the same exchange site as the server H2. Two MS Exchange servers are built in a single site configuration. This allows the two MS Exchange servers H2, H3 to exchange their directories between them with one server H2 acting as a DS Server to migrated MSMail Post Offices such as Post Office C and the other MS Exchange Server H3 acting as a DS requestor to the old MSMail DS Server H. The updates from the old MS Mail DS Server H are sent to the one Exchange server H3. Site replication takes place between the Exchange Servers H3, H2 which then pass the updates from the MS Mail DS Server on to the migrated MS Mail Post Offices. This also happens in reverse which ensures that the two separate MS Mail networks have a common single directory. Effectively two MS Mail Networks are now one.

In more detail, the DS requester on server H3 is setup to import addresses from the MSMail Directory server H into a single folder F1. This folder is replicated through standard Exchange Site replication to server H2. This folder is then available to server H2 for input in MSMail Directory Synchronization. Each Post Office migrated to the new Exchange DS server H2, places its addresses in a folder specific to the Post Office, eg FS1 to FSn. Each of these folders is then replicated across to server H3 by standard site replication. The directory requestor on server H3 is setup to export folders F1, and FS1 to FSn. The directory server on server H2 is setup to export to each requester the required folders from FS1 to FSn and F1. This enables complete flexibility over the distribution of addresses.

The folder F1 contains the complete directory of the old MSMail Network, and can be used to monitor the progress of migration. To achieve a migration and network sharing, the following simple steps are required.

A. Redirect all mail on a migrating Post Office, for example, Post Office C to new HUB server H2 instead of H.

B. Remove the DS requester for the migrating Post Office C from server H

C. Delete all user entries for the Post Office C from the server H

D. Server H3 requests all updates from server H. This will delete all Post Office C users from the folder F1 on H3. This folder is then replicated across to the new server H2.

E. Update the DS Requester on Post Office C to point to server H2 as the new DS server.

F. Carry out a directory synchronization cycle from Post Office C to the new server H2. All Post Office C users are sent up, now owned by H2 into a new folder FS1.

G. After folder FS1 has synchronized to H3, a directory synchronization cycle is carried out from H3 to H. This ensures that all Post Office C users are now synchronized back into the old environment.

This ensures that the customer has a seamless migration where their users can exchange mail with their work colleagues without even knowing that there has been a change.

What is claimed is:

1. A method of migrating a mail post office from a first mail server to a second mail server in a mail network, said first mail server acting as a first mail directory synchronization server (DS Server) and said post office initially acting as a mail directory synchronization requestor (DS Requestor) to said first DS Server, said method comprising the steps of:

a. establishing said second mail server as a second DS Server;

b. establishing a third mail server acting as a DS Requestor to said first DS Server;

c. redirecting mail on said post office to said second mail server;

d. removing the DS requester for said post office from said first server;

e. deleting all user entries for said post office from a mail directory on said first server; and f. adding said post office as a DS Requester to said second server.

2. A method as claimed in claim 1 further comprising the step of:

d2. causing said third server to request any mail directory updates from said first server to delete said post office users from said third server mail directory.

3. A method as claimed in claim 2 further comprising the step of:

d3. replicating said third server to said second server.

4. A method as claimed in claim 1 further comprising the steps of:

f2. carrying out a mail directory synchronization cycle from said post office to said second server; and f3. carrying out a mail directory synchronization cycle from said third server to said first server to ensure that all said mail directory entries for said post office users are synchronized back to said first server.

5. A mail network comprising a first, second and third mail server, said first mail server acting as a first directory synchronization server (DS Server), said second mail server acting as a second DS Server, and said third mail server acting as a directory synchronization requestor (DS Requestor) to said first DS Server, said network comprising a first post office acting as a (DS Requestor) to said first DS Server and a second post office acting as a (DS Requestor) to said second DS Server, each of said DS Requestors and DS Servers including respective mail directories, wherein said second and third servers are interconnected so that mail directory updates on said first post office are replicated from said third server to said second server and mail directory updates on said second post office are replicated from said second server to said third server.

6. A network as claimed in claim 5 in which said first mail server is an MS-Mail server.

7. A network as claimed in claim 5 in which said second and third mail servers are Ms-Exchange servers.

* * * * *